Nov. 27, 1956 R. Q. BOYER 2,771,999
FILTERING APPARATUS
Filed Jan. 5, 1945 3 Sheets-Sheet 1

*INVENTOR.*
ROBERT Q. BOYER
BY
Robert A. Lavender

INVENTOR.
ROBERT Q. BOYER

United States Patent Office 2,771,999
Patented Nov. 27, 1956

2,771,999

FILTERING APPARATUS

Robert Q. Boyer, Berkeley, Calif., assignor to the United States of America as represented by the United States Atomic Energy Commission Application January 5, 1945, Serial No. 571,422

13 Claims. (Cl. 210—113)

This invention relates to filtering systems, and particularly to filtering apparatus employing so-called "thimble" or "candle" filters in a manner designed to handle extremely valuable precipitates substantially without any loss.

In separating such precipitates from a liquid suspending medium, the volume of slurry to be handled may be relatively small as compared with that handled in most commercial filtration processes, and yet sufficiently great to require more efficient filtration methods and apparatus than are commonly available in a laboratory. The losses of precipitate encountered in using most commercial filtering devices, as a result of incomplete precipitate separation and because of difficulties encountered in completely removing the precipitate from the filtering medium, in cleaning the tanks, etc. and as a result of splashing, dripping, and other accidental losses, contribute to make such apparatus unsatisfactory for use on a small scale in the recovery of valuable material requiring the maintenance of precipitate losses at substantially zero.

In a cofiled application of Ross Cummings, Serial No. 571,421, filed January 5, 1945, there is disclosed a filtering system and apparatus particularly designed to avoid the various unsatisfactory features of conventional apparatus in the handling of extremely valuable precipitates. The present invention constitutes an improvement on the Cummings invention.

It is an object of this invention to provide an improved combination filtering, washing, and drying system for efficiently handling a slurry that is available either in batches or in a small but constant flow of material.

It is a further object of this invention to accomplish the foregoing with a maximum efficiency of separation and with a minimum hold-up of material during the filtering, washing, and drying steps.

A further object of the invention is to provide apparatus capable of accomplishing a maximum through-put of material under conditions of high separating efficiency and minimum hold-up of material.

A further object is to provide apparatus capable of carrying out the filtering, washing, and drying steps in such a manner that substantially none of the precipitate to be filtered will be lost as a result of splashing, dripping, absorption, adherence to discarded, worn out, filtering media, or other such causes which make conventional filtering devices unsatisfactory for the handling of valuable materials.

A further object is to provide apparatus which, though in large part manually controlled, is equipped with certain protective features adapted to minimize the changes that the process will be disrupted or that valuable material will be lost or contaminated because of careless or faulty operation.

Further objects of the invention will become apparent from the following detailed description and the accompanying drawings in which.

Referring to the specific embodiment of the invention shown in the drawings, a circular table, generally designated 10, supports seven stainless steel tanks 11, 12, 13, 14, 15, 16, and 17, arranged in radially spaced-apart relation in a horizontal circular array on the top of the table 10 adjacent an upstanding, stainless steel, peripheral rim 20 surrounding the table. The table comprises a suitable arrangement of legs 21 supporting a circular, wooden top structure 22 covered by a stainless steel sheet 23 that is joined by a leak-proof welded seam 24 to the stainless steel rim 20. The rim 20 may be additionally secured to the top structure 22 by wood screws 25 to hold the rim 20 and the sheet 23 firmly in place. Each of the above-mentioned tanks is welded to the sheet 23 around its entire lower periphery to provide leak-proof seams 26 that prevent liquid from seeping between the sheet and the tanks and that assist in anchoring the tanks in place.

Six of the seven tanks 11, 12, 13, 14, 16 and 17 are structurally identical, and each of the six is provided in the center of its bottom portion with an outlet opening 27 in which is mounted an outlet conduit 28, also preferably made of stainless steel and suitably secured in the outlet opening 27 in a leak-proof manner, as by welding. Each outlet conduit 28 extends downwardly through the sheet 23 and through the table top structure 22 and includes a suitable control valve 29 of any simple type easy to clean.

Figure 7:
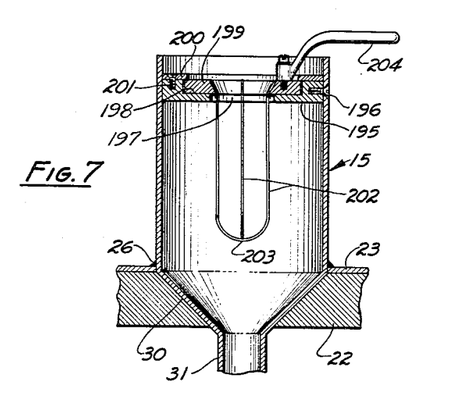
Fig. 7 is a vertical section taken along the line 7—7 of Fig. 4 and shows one of the tanks and a scraper mechanism mounted therein for removing a filter cake from a filter element inserted into that tank.
Figure 8:
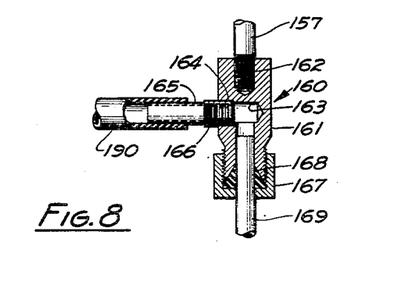
Fig. 8 is a vertical section taken through a portion of Fig. 2 and shows one of two fittings that respectively support the two filter elements and provide connecting passageways between sections of conduits communicating with the interior of the two filter elements.

One of the seven tanks 15, shown in detail in Fig. 7, is of a different construction than the others. This tank 15 is provided with a funnel-shaped bottom portion terminating in an outlet conduit 31, of considerably greater diameter than the outlet conduits 28 associated with the other tanks. This last mentioned outlet conduit 31 preferably extends vertically throughout its length and communicates at its lower end with a suitable receptacle (not shown) positioned directly below the tank 15 and adapted to receive dried precipitate from a loaded filter element inserted into that tank. All joints between sections of the tank 15 and of the associated outlet conduit assembly are preferably welded on the inside and ground smooth to eliminate all cracks and rough surfaces which might retain particles of dried precipitate. This tank contains suitable mechanism for scraping a cake of precipitate from a filter element, the mechanism being shown in greater detail in Fig. 7 and described more fully hereinafter.

Figure 4:
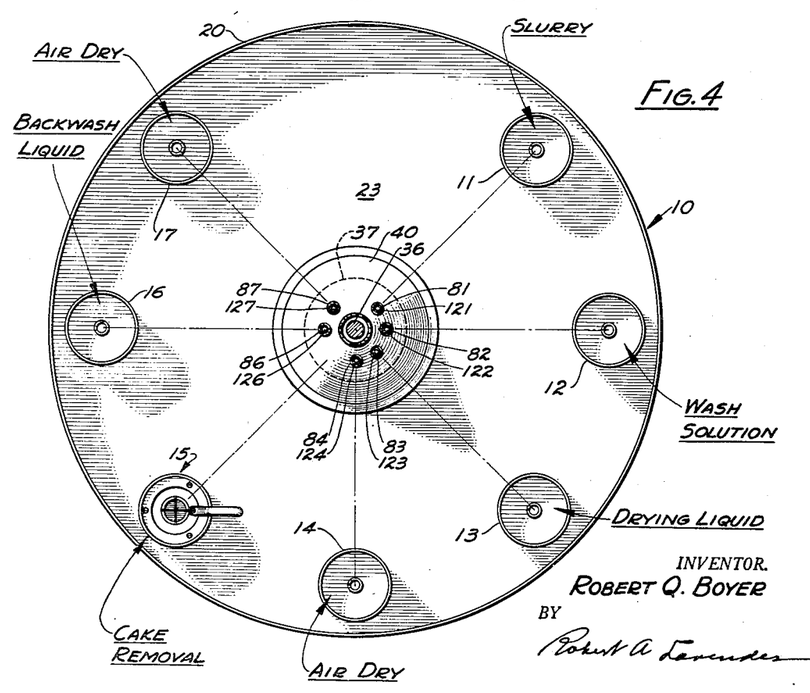
Fig. 4 is a horizontal section taken along the line 4—4 of Fig. 2 and shows an arrangement of suction and positive pressure conduits around the central filter support for association with the valves and tanks illustrated in Figs. 1 to 3.
Figure 5:
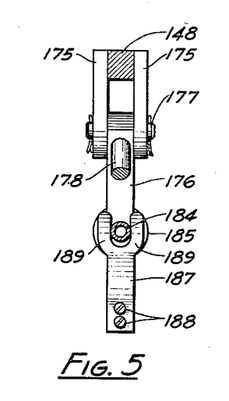
Fig. 5 is a horizontal section taken along the line 5—5 of Fig. 3 and shows details of the mechanism for controlling the valves of Fig. 3.
Figure 6:
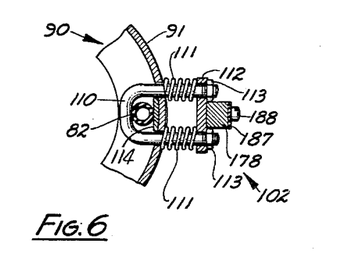
Fig. 6 is a vertical section taken along the line 6—6 of Fig. 3 and shows additional details of the mechanism for controlling the valves of Fig. 3.

A central aperture 35 extends through the sheet 23 and the table top structure 22 to accommodate a vertical shaft or column 36 adapted to support, at its upper end, a group of valves and two or more filter supporting arms carrying filter elements mounted thereon for movement along a circular path about the shaft 36. A supporting plate 37 rests upon the sheet 23 and is centrally apertured to accommodate the shaft 36 to which it is welded for supporting the shaft on the table. A lower plate 38, similar to the supporting plate 37 and also centrally apertured to accommodate the shaft 36, serves as a washer; and a nut 39, threaded on the lower end of the shaft 36, bears against the plate 38 to assist in holding the shaft 36 rigidly in its vertical position. To provide additional support for the shaft 36, a generally conical structure 40 surrounds the shaft and is secured thereto by an upper circular weld 41 and to the sheet 23 by a lower circular weld 42. The conical structure 40 is pierced by six apertures 32 that are spaced apart in a circular array around the conical structure, as shown in Fig. 4, to accommodate, respectively, six suction tubes that extend vertically downwardly from a valve mechanism mounted adjacent the upper end of the shaft 36, through the conical structure 40, and through six aligned apertures 33 that penetrate the plates 37 and 38, the sheet 23, and the table top structure 22.

Figure 1:
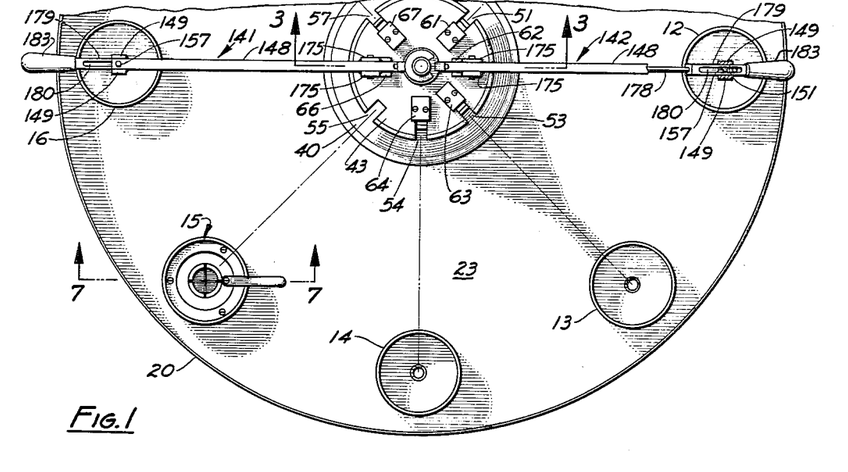
Figure 1 is a fragmentary plan view of apparatus embodying the present invention and shows a table supporting a number of tanks arranged in a circular array and a pair of laterally extending filter supporting arms mounted on a central support and adapted to carry a pair of filter elements along a circular path into alignment with the tanks in sequence and to permit movement of the filter elements into and out of any aligned tank.

Adjacent, but spaced from, the top of the vertical shaft 36, there is secured a generally circular, valve supporting, guide plate 43 that is centrally apertured to accommodate a sleeve or collar 44 threaded into the aperture. The shaft 36 passes through the sleeve 44, and a pair of set screws 45 are threaded into the sleeve and bear against the shaft 36 to hold the sleeve and the associated guide plate 43 against rotation about the shaft 36 and against downward movement thereon. The guide plate 43 is provided with seven radially extending guide slots 51, 52, 53, 54, 55, 56, and 57 that are spaced apart around the guide plate as shown in Fig. 1, the center line of each of the slots being located in a radial plane passing through the shaft 36 as a center and through the center of an associated one of the tanks mounted on the table 10. Six valve blocks 61, 62, 63, 64, 66, and 67 are secured to the guide plate 43 adjacent the inner end of six of the seven slots 51, 52, 53, 54, 56, and 57, respectively, the slot 55 opposite the scraper tank 15 not being associated with one of the valve blocks. The six valve blocks are identical in construction, and each is independently secured to the guide plate 43 above an aperture 58 therethrough by a pair of cap screws 68 that are tapped into the guide plate. Each valve block defines a chamber 69 that extends horizontally into the valve block from a port in an end thereof adjacent the inner end of the associated slot in the guide plate 43. This port is enlarged to provide an inner seat 70 for a short stainless steel tube 71 and to provide an outer seat 72 for a ring 73 that surrounds the tube 71 in a tight fit. The outer diameter of the ring 73 is such that the ring will be compressed sufficiently when it is forced into the seat 72 to hold it and the associated tube 71 firmly in place. A passageway 74 extends downwardly from the opposite end of the chamber 69 to a port in the lower surface of the valve block, and this port is enlarged with respect to the passageway 74 to provide a seat 75 for a short stainless steel tube 76 secured in place in the seat by welding or by hard solder. The short stainless steel tube 76 associated with each valve block extends downwardly through the aperture 58 positioned directly behind the associated slot in the guide plate 43, and six tubes 81, 82, 83, 84, 86, and 87 respectively extend through the six apertures 58 in the guide plate 43 and fit tightly over the six associated stainless steel tubes 76 to form fluid-tight connections therebetween.

A bracket, generally designated 90, comprising a cylindrical wall 91, a bottom end portion 92, and an upper flange 93, is secured to the bottom of the guide plate 43 by cap screws 94 that pass through the flange 93 and are tapped into the guide plate. The bottom end portion 92 of the bracket 90 has a large aperture 94 therethrough, and the bracket is coaxially mounted on the guide plate 43 with the vertical shaft 36 passing through the center of the aperture 94.

Six separate pinch clamp mechanisms, generally designated 101, 102, 103, 104, 106, and 107, are mounted on the cylindrical wall 91 of the bracket 90 in association with the six tubes 81, 82, 83, 84, 86, and 87, respectively, for normally holding these tubes in a collapsed condition to prevent fluid flow therethrough. The six pinch clamp mechanisms are respectively operable to release the associated tubes to permit fluid flow therethrough. The six pinch clamp mechanisms are identical in construction. Referring to one of these mechanisms 102, for example, it comprises a U-shaped member 110 of circular cross section. Each leg of the U-shaped member passes outwardly through a separate aperture provided therefor in the cylindrical wall 91 of the bracket 90, with the two legs straddling the associated tube 82. A helical spring 111 surrounds each leg of the U-shaped member 110 outside of the cylindrical wall 91 of the bracket 90, and the two springs associated with each U-shaped member 110 are held under substantially uniform compression by a cross bar 112 that is apertured adjacent each end to accommodate the two legs of the U-shaped member. Nuts 113 threaded on the ends of the legs of the U-shaped member, bear upon opposite ends of the cross bar 112 and hold it against the springs 111. A block 114 is soldered or welded to the inside of the cylindrical wall 91 of the bracket 90 between the legs of the U-shaped member 110 to provide an abutment against which the associated tube 82 is pressed by the U-shaped member to maintain the tube normally in a collapsed condition. Alternatively, the block 114 may simple be built up of solder deposited on the inside of the cylindrical wall 91 to the required thickness.

The six tubes 81, 82, 83, 84, 86, and 87 extend vertically downwardly and, at their lower ends, fit over the ends of six stainless steel tubes 121, 122, 123, 124, 126, and 127, respectively, that pass vertically downwardly through the six holes 32 in the conical member 40 and through the six holes 33 in the two plate 37 and 38, in the sheet 23, and in the top structure 22 of the table 10. After passing downwardly through the table 10 in the manner described, the stainless steel tubes respectively communicate with sources of suction or sources of positive pressure adapted to draw fluid through the associated tubes into separate collection tanks or to force fluid from separate reservoirs through the associated tubes. A suitable arrangements of suction apparatus and positive pressure apparatus for this purpose is disclosed in the Cummings' application, Serial No. 571,421, referred to above.

The sleeve 44 that surrounds the shaft 36 adjacent its upper end, in addition to supporting the guide plate 43, supports eight bearing rings 131, 132, 133, 134, 135, 136, 137, and 138, placed one above another around the upper end of the shaft 36. A ninth ring or collar 139 also fits around the upper end of the shaft 36, above the eight bearing rings, and is provided with a set screw 140 that holds it against movement along the shaft 36. In this manner the eight bearing rings are held against movement along the shaft 36 by the restraining action of the collar 139 and of the sleeve 44, but are free to rotate about the shaft 36.

These eight bearing rings are adapted to be employed in pairs as mountings for a number of laterally extending filter supporting arms. In this instance, there are illustrated two such arms, generally designated 141 and 142, that differ only slightly in construction. The filter supporting arm 141 comprises a mounting bracket 145 secured by cap screws 147 at its upper and lower ends, respectively, to a pair of bearing rings 131 and 136 on the shaft 36; a horizontal beam 148 extending radially outwardly normal to the shaft 36; a pair of spaced apart vertical bars 149, welded at their upper ends on opposite sides of the hornzontal beam 148 at the outer end thereof; and a spacer block 150, welded between the vertical bars 149 at the lower ends thereof to hold them in spaced apart parallel relation so as to define a guide slot 151 therebetween. The opposite ends of the bracket 145 are respectively mounted in slots that extend radially into the first and sixth bearing rings 131 and 136, counting from the lowermost ring (one of such slots being provided in each of the eight bearing rings identical with the slot 143 shown in Fig. 3 in the eighth bearing ring 138). The horizontal beam 148 of the filter supporting arm 141 is mounted on the bracket 145 near the upper end thereof. The bracket 146 associated with the other filter supporting arm 142 is secured in radial slots in the third and eighth bearing rings 133 and 138, and the horizontal beam 148 of this filter supporting arm 142 is mounted on the associated bracket 146 at a point slightly below the center thereof and at the same height as the horizontal beam 148 of the first described filter supporting arm 141. With this arrangement, the two filter supporting arms 141 and 142 are mounted for independent rotary movement about the central shaft 36 in the same horizontal plane. Except for the difference in the mounting of the horizontal beams 148 on their respective brackets 145 and 146, the two filter supporting arms 141 and 142, including the associated parts still to be described, are identical in construction and function. The following further description of one filter supporting arm 141, therefore, is also applicable to the other filter supporting arm 142.

Obviously, if desired, a third such filter supporting arm and its associated parts could be mounted on the second and seventh bearing rings 132 and 137, and an even larger number of filter supporting arms could be employed by the addition of more bearing rings and suitably proportioned supporting brackets.

Referring to the first mentioned filter supporting arm 141, two aligned vertically extending apertures 155 and 156 are provided in the radially outer end of the horizontal beam 148 and in the spacer block 150, respectively. A vertically disposed rod 157 is slidably mounted in these aligned apertures between the pair of vertical bars 149 and is of a length sufficient to permit its lower end to drop below the spacer block 150 a distance somewhat greater than the length of the vertical bars 149 while the upper end of the rod is still retained in the aperture 155 in the horizontal beam 148.

At its lower threaded end, the vertically disposed rod 157 carries a fitting, generally designated 160. This fitting comprises a generally hexagonal stainless steel, body portion 161, provided at its upper end with a threaded aperture 162 adapted to receive the correspondingly threaded lower end of the rod 157. A tubular passageway 163 extends into one side of the body portion 161 of the fitting 160 and then extends vertically downwardly and out the lower end thereof. The opening 164 in the side of the fitting 160 is internally threaded to receive a correspondingly threaded end 166 of a stainless steel nipple 165. The lower end of the body portion 161 of the fitting 160 is externally threaded to receive a correspondingly threaded cap 167 having a central aperture in its end coaxially disposed with reference to the vertical portion of the passageway 163 and of the same internal diameter. The lower end of the passageway 163 is outwardly flared, and a packing ring 168, tapered to fit in the flared end of the passageway 163, is contained within and substantially fills the cap when it is mounted on the body portion 161 of the fitting 160. A vertically disposed, stainless steel tube 169 depends from the fitting 160 and, at its upper end, extends snugly through the aperture in the cap 167, through the ring, and a substantial distance into the vertical portion of the passageway 163. Thus, tightening the cap 167 on the body portion 161 of the fitting 160 compresses the packing ring 168 and causes it to grip the tube 169 passing therethrough sufficiently to seal the joint between the tube 169 and the body portion of the fitting and to hold the tube 169 against withdrawal. A hollow, porous, thimble filter element 170, having a nonporous stainless steel filter head 171 cemented thereto and closing the upper end thereof, is rigidly secured by welding to the vertically disposed, stainless steel tube 169 with the tube 169 passing through an aperture in the filter head 171 and into the filter element to a point close to the bottom thereof. A continuous conduit is thereby provided through the nipple 165, through the passageway 163 in the fitting 160, and through the depending stainless steel tube 169 to the interior of the filter element 170.

The length of the horizontal beam 148 of the filter supporting arm 141 is such that the filter element 170 is rotatable therewith along a circular path above the seven tanks mounted on the table 10 and into alignment with the tanks in sequence. By sliding the vertically disposed rod 157 downwardly and upwardly, the filter element 170 may be moved into and out of any aligned tank.

Figure 2:
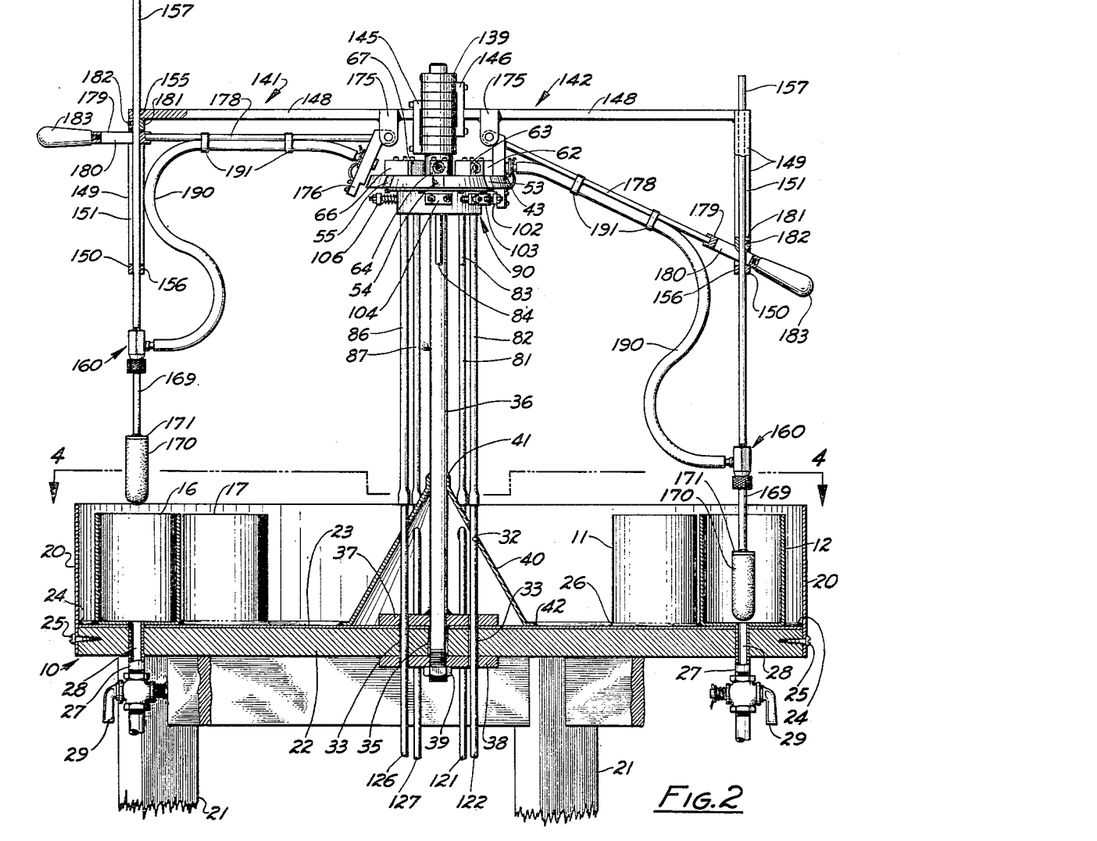
Fig. 2 is an elevation of the apparatus shown in Fig. 1, partly in section and partly broken away for clarity, and shows one filter element above and in alignment with one tank and the other filter element in a lowered position in another tank.

A combination filter moving and valve operating device is mounted on the filter supporting arm 141 by means of a pair of brackets 175 that are secured to and depend from the horizontal beam 148 adjacent the radially inner end hereof. A block or abutment 176 is pivotally mounted between the brackets 175 on a pin 177 that passes through aligned apertures in the two brackets 175 and in the upper end of the block. A rod 178, welded into an aperture in the upper end of the block 176 and serving as a filter manipulating member, extends radially outwardly therefrom with respect to the pin 177 on which the block is pivotally mounted, so that the rod and the block constitute a bell crank pivoted on the pin. At its outer end the rod 178 is rigidly welded in an aperture in one end of a second block 179 that has a longitudinally extending slot 188 therethrough. The vertically disposed rod 157 passes through the slot 180 in the slotted block 179 and also passes through an aperture in a guide block 181 that is rigidly secured to the rod 157 by a set screw 182 and that is rounded at its lower end. The guide block 181 rests on the slotted block 179 and is free to slide vertically between the spaced-apart vertical bars 149. This guide block is secured to the rod 157 at such a point along its length that the associated filter element 170 is supported in a raised position above the level of the upper edges of the several tanks when the rod 178 is swung to a horizontal raised position (as shown on the left side of Fig. 2). When the rod 178 is swung to a lowered position, the vertically disposed rod 157 is caused to slide downwardly, by its own weight and the weight of the fitting 160 and the filter element 170 supported thereby. Downward movement of the vertically disposed rod 157 is arrested in its lowered position when the slotted block 179 reaches its lowermost position and stops further downward movement of the guide block 181 riding thereon. When the rod 178 is swung back to its raised position, the guide block 181 rides upon the slotted block 179 and carries the filter element 170 back to its raised position above the level of the upper edges of the tanks. A handle 183 is secured to the outer end of the slotted block 179 to provide convenient means for manipulating the rod 178 for lowering and raising the filter element 170 supported thereby. As shown on the left side of Fig. 2, the inner portion of the slotted block 179 is in contact with the rod 157 when the rod 178 is in its horizontal raised position. There will thus be some resistance to swinging the rod 178 into and out of its extreme raised position because of binding between the inner portion of the slotted block 179 and the adjacent side of the rod 157. However, because of the relatively large radius of the arcuate path of travel of the slotted block 179 and because of the normal amount of play to be expected in the connections of the several relatively movable parts of the assembly, this binding will not be great and will assist in retaining the arm 178 in its horizontal raised position against the force of gravity acting upon it and upon the several parts suspended therefrom.

Figure 3:
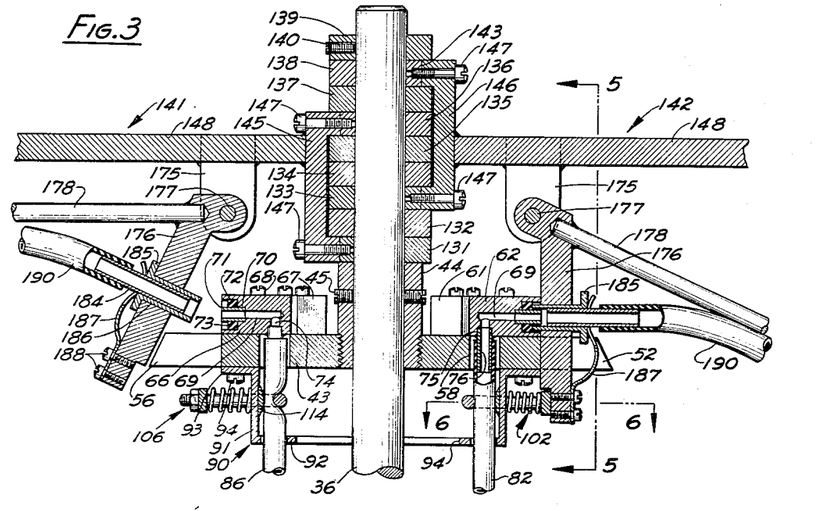
Fig. 3 is a vertical section of a portion of the apparatus shown in Figs. 1 and 2, the section being taken along the line 3—3 of Fig. 1 and showing in greater detail the mounting of the filter supporting arms on the central support and the construction and arrangement of valves for controlling the operation of the filter elements.

The angle between the radially extending rod 178 and the associated block 176 is such that the block 176 assumes the position shown on the left-hand side of Fig. 3 when the rod 178 is in its horizontal, raised position. When the rod 178 is swung downwardly to its lowered position, the block 176 is caused to pivot from the position shown on the left-hand side of Fig. 3 to a vertical position, corresponding to that shown on the right-hand side of Fig. 3, and to enter one of the slots in the guide plate 43. Unless the filter supporting arm on which the block 176 is mounted is positioned in vertical alignment with one of the tanks on the table 22 and with one of the slots in the guide plate 43, the block 176 will be prevented from swinging downwardly to its vertical position by contact with the outer, beveled edge of the guide plate. Thus, the filter element 170 cannot be moved downwardly from its raised position unless it is in vertical alignment with one of the tanks on the table 22.

A flanged, generally cylindrical, stainless steel collar 185 projects through an aperture 186 in the block 176 and extends inwardly from the block 176 a short distance toward the vertical center line of the filter supporting structure with the flanged end of the collar normally resting against the outer side of the block. A leaf spring 187 is secured at one end by a pair of cap screws 188 to the lower end of the block 176, and the other end of the spring is provided with two arms 189 that bear against the flange of the collar 185 at diametrically opposite positions to hold it in its normal position against the outer side of the block. A short section of stainless steel tubing 184 extends about two-thirds of the way into the flanged collar 185 from the flanged end thereof and extends between the two arms 189 of the leaf spring 187 and outwardly from the flanged end of the collar a sufficient distance to form a nipple for a connecting flexible tube 190 thereto. The section of tubing 184 is welded to the collar 185, and the tube 190 fits tightly around the projecting end of the section of tubing and runs outwardly along the radially extending rod 178, to which it is secured by a pair of clamps 191, and then downwardly and around the projecting end of the nipple 165 of the fitting 160 to provide a conduit connecting the passageway 163 in the fitting with the interior of the flanged collar 185 mounted in the block 176.

The flanged collar 185 is so positioned that the block 176 may be moved about the pin 177 to bring the collar to a position surrounding the metal tube 71 and bearing firmly against the ring 73 in one of the valve blocks on the guide plate 43 when the radially extending rod 178 is swung to its lowered position. Such positioning of the flanged collar 185 places the valve chamber 69 in the cooperating valve block in fluid-tight communication with the interior of the hollow filter element 170 through the flanged collar, through the section of stainless steel tubing 165, and through the connecting conduits described above. At the same time this is accomplished, the lower end of the block 176 contacts the cross bar 112 of the pinch clamp mechanism associated with the cooperating valve block and operates the pinch clamp mechanism against the pressure of the helical spring 111 to release the associated tube and permit fluid flow therethrough. When the radially extending rod 178 is swung back to its raised position, the block 176 is moved out of the slot in the guide plate 43 opposite the cooperating valve block, whereby the associated pinch clamp mechanism is released to collapse the associated tube and prevent fluid flow therethrough, and the flanged collar 185 is disconnected from the valve chamber 69 in the cooperating valve block.

With the radially extending rod 178 in its horizontal, raised position, the filter supporting arm 141 may be rotated about the central shaft 36 to carry the associated filter element into alignment with any selected one of the tanks on the table 10 and simultaneously to align the pivotally mounted block 176 with one of the slots in the guide plate 43 and (except as noted below) with a cooperating valve block and associated pressure differential conduit. By stopping rotation of the filter supporting arm 141 with the associated filter element in alignment with one of the tanks, and with the associated block 176 in alignment with one of the slots in the guide plate 43, the handle 183 may be lowered to insert the filter element into the aligned tank and to swing the pivotally mounted block 176 into the aligned slot in the guide plate 43, whereby an associated pressure differential conduit is placed in communication with the interior of the hollow filter element.

Similarly, the other filter supporting arm 142 may be rotated about the central shaft 36 to carry the associated filter element into alignment with any selected one of the tanks on the table 10 and simultaneously to align the associated pivotally mounted block with one of the slots in the guide plate 43 and (except as noted below) with a cooperating valve block and associated pressure differential conduit. By stopping rotation of the filter supporting arm 142 with the associated filter element 170 in alignment with one of the tanks, and with the associated pivotally mounted block 176 in alignment with one of the slots in the guide plate 43, the handle 183 associated with the filter supporting arm 142 may be lowered to insert the associated filter element into the aligned tank and to swing the pivotally mounted block 176 into the aligned slot in the guide plate 43, whereby an associated pressure differential conduit is placed in communication with the interior of the hollow filter element.

While the two filter supporting arms 141 and 142 have been referred to as being mounted for independent rotary movement about the central shaft 36, it will be understood, of course, that it is not possible for one of the filter supporting arms to pass the other or for them both to be positioned in alignment with the same tank.

As may have been noted from the foregoing description, the slot 55, in the guide plate 43, that is radially aligned with the scraper tank 15 is not provided with an associated valve block, pressure differential conduit, and pinch clamp mechanism. Since this slot 55 is radially aligned with the scraper tank 15, employed only to scrape a filter cake from a filter element lowered therein, it is unnecessary to apply either suction or positive pressure to the interior of the filter element while this scraping function is being performed. However, this slot 55 is necessary to permit the radially extending rods 178 to be swung downwardly to lower the associated filter element into the scraper tank 15.

The scraper tank 15 contains a scraper mechanism illustrated in Fig. 7 and previously mentioned. This mechanism comprises a generally disk-shaped collar 195 that is horizontally disposed in the scraper tank 15 adjacent the upper, open end thereof and is held in place by a number of screws 196 (only one being shown). The collar 195 is provided with a central aperture 197 therethrough of a diameter somewhat larger than the diameter of the filter elements 170, and is relieved around the upper end of the aperture 197 to provide a seat 198 for a scraper supporting ring 199 that fits loosely in the seat for rotary movement about a vertical axis. A retaining ring 200 rests upon the upper surface of the collar 195 with its inner peripheral edge disposed inwardly of and in overlapping relationship with the scraper supporting ring 199. The retaining ring 200 is secured to the collar 195 by a number of screws 201 (only one being shown)

whereby the scraper supporting ring 199 is locked against withdrawal from its seat in the collar 195. The inner peripheral edge of the scraper supporting ring 199 is tapered inwardly and downwardly, and a pair of U-shaped wire scraper elements 202 are secured at their opposite ends to the tapered inner surface of the scraper supporting ring at diametrically opposite points. The two scraper elements are substantially identical and are respectively mounted in vertical planes normal to each other. Where the two scraper elements intersect at a point 203 in the center of their curved bottom portions, one of the elements may be severed and its two severed ends welded to the other element, or one of the elements may be bent downwardly around the bottom of the other and welded thereto. A handle 204 is mounted on the scraper supporting ring 199 for manually rotating the ring to cause the scraper elements 202 to rotate around a filter element 170 in contact therewith. Thus, when a filter element 170 carrying a filter cake is lowered into the scraper tank 15, the filter element drops into the cage-like structure defined by the scraper elements 202, and the filter cake may be removed by manipulating the handle 204 to rotate the scraper elements back and forth through an angle of 90° more or less.

As previously indicated, the six stainless steel pressure differential conduits that extend downwardly through the table 10 communicate with suitable sources of suction or positive pressure. Convenient apparatus for applying either suction or positive pressure to selected ones of the pressure differential conduits is disclosed in the copending Cummings' application, Serial No. 571,421, referred to above. By means of such apparatus, or any suitable substitute therefor, provision is made for maintaining suction in the first, second, third, fourth, and sixth pressure differential conduits 121, 122, 123, 124, and 127, respectively disposed radially opposite the slurry tank 11, the wash tank 12, the drying liquid tank 13, the first air drier tank 14, and the second air drier tank 17. The pressure differential conduit radially opposite the backwash tank 16 is employed to supply a suitable backwash liquid under pressure to the interior of the hollow filter element when it is lowered into the backwash tank, and this pressure differential conduit 126 is maintained in communication with suitable apparatus (also disclosed in the Cummings' application) for supplying the backwash liquid under pressure.

As may have been noted from Fig. 4 of the drawings, the spacing of the tanks around the periphery of the table 10 is substantially uniform except that the space between the first tank 11 and the last tank 17 is twice the spacing between any other pair of tanks. The purpose of this is to provide an idle position for one of the filter supporting arms. If desired, an eighth slot may be provided in the guide plate 43 between the first slot 51 radially opposite the first tank 11 and the last slot 57 radially opposite the last tank 17 so that a filter supporting arm may be temporarily locked in the idle position by lowering the handle 183 and causing the pivotally mounted block 176 to swing downwardly into the eighth slot.

Now, considering the operation of the embodiment of the invention described above, it will be noted that the seven tanks shown in Fig. 4 are labeled to identify their respective functions. For convenience, the operation of the apparatus will be described with reference to a specific process in which the apparatus may be employed with particular advantage, and specific materials to be employed in the slurry tank 11, the wash solution tank 12, and the backwash tank 16 will be identified. In this connection, reference is made to my copending application, Serial No. 577,380, filed February 12, 1945. As referred to therein, the operation of a "calutron," which is a machine designed to separate the constituent isotopes of a polyisotopic element, results in the formation of deposits of the element upon parts of the calutron disposed in the source region thereof, as well as upon one or more collector units and supporting structure therefor. In order to recover the valuable constituents of these deposits it is customary to collect the water soluble portions of the deposits in a water wash solution and to recover other portions in an acid wash solution. Such solutions, singly or collectively, are denoted as "calutron wash solution." In that application, there is disclosed a complete plant process for treating a "calutron wash solution" containing uranium enriched with the $U^{235}$ isotope and for recovering, with negligible losses to the outside, all of the uranium contained in the solution. In the process described in that application, a slurry of uranous oxalate is produced that consists of $U(C_2O_4)_2 \cdot 6H_2O$ as the precipitate suspended in a 1 N to 3 N hydrochloric acid solution containing ions of $Fe^{++}$, $Cr^{+++}$, $Ni^{++}$, $Cu^{++}$, and perhaps a trace of $U^{++++}$, and un-ionized $H_2C_2O_4$. It is necessary that the precipitate of $U(C_2O_4)_2 \cdot 6H_2O$ be separated from positive metal ions by filtration and washing, and, since the uranium in the precipitate is enriched with $U^{235}$, which it is the entire object of the process to recover without loss, the exercise of extreme care in the separation procedure is absolutely necessary.

In handling the slurry described above in accordance with my above mentioned copending application, the filter cake loaded upon a filter element is washed with an approximately 0.2 molar solution of oxalic acid in about 1 N hydrochloric acid heated to a temperature of approximately 60° C., whereby any $Fe^{++}$, $Cr^{+++}$, $Ni^{++}$, $Cu^{++}$, and $U^{++++}$ ions occluded by the filter cake are washed away. Following the oxalic acid wash, substantially anhydrous methyl or ethyl alcohol (preferably the former) is percolated through the filter cake for the purpose of displacing residual oxalic acid wash solution and carrying off water of hydration to convert the $U(C_2O_4)_2 \cdot 6H_2O$ to $U(C_2O_4)_2 \cdot H_2O$. The change of the green hexahydrate form of the filter cake to the violet monohydrate form provides a convenient visual indication of a satisfactory degree of dehydration. Following dehydration, the filter cake is scraped from the filter element and falls into a container in which it is pulverized for subsequent calcination.

The present invention is admirably adapted to perform the above described recovery of $U(C_2O_4)_2 \cdot H_2O$ from the suspension of $U(C_2O_4)_2 \cdot 6H_2O$ in the hydrochloric acid solution. When employing the embodiment of the invention described above for performing this recovery operation, the slurry to be filtered is charged into the slurry tank 11, the oxalic acid wash solution is charged into the wash tank 12, and the methyl alcohol is charged into the drying liquid tank 13, the associated valves 29 being closed. Depending upon the size of these tanks, it may be desirable to provide suitable apparatus for maintaining the liquid level in these tanks as liquid is drawn therefrom through a filter element inserted therein. If the tanks are sufficiently large, such apparatus is unnecessary, and its use may be avoided merely by recharging the tanks at intervals.

For the specific process being considered by way of illustration, a 3 to 5% sodium hypochlorite solution is a suitable backwash liquid to be supplied under pressure to the pressure differential conduit 126 radially opposite the backwash tank 16. The valve 29 below the backwash tank 16 is normally open so that backwash liquid supplied through the pressure differential conduit 126 to the interior of a filter element when it is inserted in the backwash tank 16 may be conducted from this tank through the associated outlet conduit 27 to a suitable reservoir.

With one of the filter supporting arms (hereinafter referred to as the first filter supporting arm) aligned with the slurry tank 11, and with the other filter supporting arm (hereinafter referred to as the second filter supporting arm) positioned between the air drier tank 17 and the slurry tank 11 in an idle position, the operator lowers the filter element 170 associated with the first filter supporting arm into the slurry tank, whereby the associated pivotally mounted block 176 is moved into the aligned slot 51 in the guide plate 43 and the associated pinch clamp mechanism 101 is caused to release the associated pressure differential conduit 81 for applying suction to the interior of the filter element in the slurry tank. In this manner, filtrate is drawn through the filter element in the slurry tank and a filter cake is accumulated on the exterior surface thereof. When a filter cake has deposited to the desired thickness, the operator lifts the handle 183 to raise the filter element out of the slurry tank to its upper position and to terminate the application of suction thereto by permitting the associated pinch clamp mechanism 101 to cut off flow through the associated pressure differential conduit 121.

The first filter supporting arm is then rotated to bring the filter element into alignment with the wash tank 12, and the filter element is lowered into this tank, whereby the associated pivotally mounted block 176 is moved into the aligned slot 52 in the guide plate 43 and the associated pinch clamp mechanism 102 is caused to release the associated pressure differential conduit 82 for applying suction to the interior of the filter element in the wash tank. In this manner, wash solution is drawn through the filter cake carried by the filter element in the wash tank to displace residual filtrate retained thereby. When sufficient wash solution has been drawn through the filter cake to displace substantially all of the residual filtrate retained thereby, the operator lifts the handle 183 to raise the filter element out of the wash tank to its upper position and to terminate the application of suction thereto by permitting the associated pinch clamp mechanism 102 to cut off flow through the associated pressure differential conduit 122.

The first filter supporting arm is then rotated to bring the associated filter element into alignment with the drying liquid tank 13, and the filter element is lowered into this tank, whereby the associated pivotally mounted block 176 is moved into the aligned slot 53 in the guide plate 43 and the associated pinch clamp mechanism 103 is caused to release the associated pressure differential conduit 83 for applying suction to the interior of the filter element in the drying liquid tank. In this manner, drying liquid is drawn through the filter cake carried by the filter element in the drying liquid tank to displace residual wash solution retained thereby. When sufficient drying liquid has been drawn through the filter cake to displace substantially all of the wash solution retained thereby, the operator lifts the handle 183 to raise the filter element out of the drying liquid tank to its upper position and to terminate the application of suction thereto by permitting the associated pinch clamp mechanism 103 to cut off flow through the associated pressure differential conduit 123.

The first filter supporting arm is then rotated to bring the associated filter element into alignment with the first air drier tank 14, and the filter element is lowered into this tank, whereby the associated pressure differential conduit 124 is released for applying suction to the interior of the filter element in the air drier tank. In this manner, air is drawn through the filter cake carried by the filter element in the air drier tank, and residual drying liquid retained thereby is volatilized and drawn off through the associated pressure differential conduit 124, leaving the filter cake in a dry condition. When sufficient air has been drawn through the filter cake to remove all of the drying liquid therefrom, a condition that may be visually detected as noted above, the operator lifts the handle 183 to raise the filter element out of the first air drier tank to its upper position and to terminate the application of suction thereto by permitting the associated pinch clamp mechanism 104 to cut off flow through the associated pressure differential conduit 124.

The first filter supporting arm is then rotated to bring the associated filter element into alignment with the scraper tank 15, and the filter element is lowered into this tank and into cooperative association with the wire scraper elements 202 in this tank. With the filter element in contact with the wire scraper elements, the handle 204 of the scraper mechanism is manually swung back and forth through an angle of about 90° to scrape the filter cake from the filter element and to discharge it downwardly through the outlet conduit 31 of this tank. When the filter cake has been removed from the filter element, the operator lifts the handle 183 to raise the filter element out of the scraper tank 15 to its upper position.

The first filter supporting arm is then rotated to bring the associated filter element into alignment with the backwash tank 16, and the filter element is lowered into this tank, whereby backwash liquid is supplied to the interior of the filter element from the associated pressure differential conduit 126 and is forced outwardly through the filter element to wash out any precipitate retained in the pores thereof. The uranium oxalate precipitate is soluble in the sodium hypochlorite backwash liquid, and cleaning of the filter element is accomplished both by physical washing and by chemical action. The backwash liquid discharged into the backwash tank 16, together with any precipitate removed from the filter element thereby, is evacuated from the backwash tank through the associated outlet conduit 27 to a salvage reservoir. When the filter element has been thoroughly cleaned in this manner, the operator lifts the handle 183 to raise the filter element out of the backwash tank 16 to its upper position and to cut off the flow of backwash liquid to the interior of the filter element through the pressure differential conduit 126.

The first filter supporting arm is then rotated to bring the associated filter element into alignment with the second air drier tank 17, and the filter element is lowered into this tank, whereby the associated pressure differential conduit 127 is placed in communication with the interior of the filter element and air is sucked through the filter element to draw out any residual backwash liquid retained in the pores thereof and to discharge the same through the pressure differential conduit 127 into a suitable salvage reservoir. When the filter element has been thoroughly dried in this manner, the operator lifts the handle 183 to raise the filter element out of the second air drier tank and to cut off the application of suction by permitting the associated pinch clamp mechanism 107 to cut off flow through the associated pressure differential conduit 127.

The second filter supporting arm, that was originally placed in the idle position between the second air drier tank 17 and the slurry tank 11, is obviously adapted for use in exactly the manner described above with reference to the first filter supporting arm. It may be moved through the described seven step cycle of operations about a step and a half behind the first filter supporting arm, and the two filter supporting arms may be manipulated by one operator. For example, after the first filter supporting arm has been moved out of alignment with the slurry tank 11 and into alignment with the wash tank 12 and the associated filter element has been lowered into the wash tank 12, the second filter supporting arm may be moved into alignment with the slurry tank 11 and the associated filter element lowered into this tank while wash solution is being drawn through the filter element associated with the first filter supporting arm. Similarly, when the filter element associated with the first filter supporting arm has been moved into alignment with the drying liquid tank 13 and lowered therein, the filter element associated with the second filter supporting arm may be raised out of the slurry tank 11, moved into alignment with the wash tank 12, and lowered therein. By alternately manipulating the two filter supporting arms, the operator can conveniently keep both of them in continuous operation. As soon as the first filter supporting arm 141 has completed its cycle, it may be started on a new cycle; and the second filter supporting arm 142 may be caused to follow it step by step as before.

The two filter supporting arms and the two filter elements respectively associated therewith merely constitute a plurality of substantially independent units that are identical in function. While the invention could be utilized with the same percentage recovery and purity of the final product while employing but a single such unit in association with a single array of tanks, one of the valuable features of the invention is its adaptability for using a plurality of such units with a single array of tanks to obtain maximum production with a minimum hold-up of valuable material and with a maximum economy of labor and apparatus.

In those instances in which there is specified above the materials from which parts of the apparatus should be constructed, the selection of materials was made with the process in mind that is described in my above mentioned copending application. When handling different slurries, wash solutions, and drying liquids, changes in the specified materials may be desirable to prevent attack of certain parts of the apparatus by the liquids in contact therewith.

In the light of the foregoing disclosure, it will be apparent that various modifications of the invention may be made. It is intended to cover in the appended claims all such modifications as fall within the true spirit and scope of the invention, restricted only insofar as defined in such claims.

What is claimed is:

1. Filtering apparatus comprising in combination, a tank, a filter element adapted to be moved into and out of said tank, a stationary column spaced from said tank, a stationary coupling means mounted upon said column, a first conduit attached to one end of said coupling means, a second conduit attached at one end to the filter element, a framework mounted upon said column, an adjustable filter manipulating member mounted upon said framework for movement in a plane including said tank and said coupling means and comprising a support for said filter and said second conduit, and an abutment mounted upon the manipulating member having the second end of the second conduit attached to the abutment and adapted in one position to make fluid-tight contact with the coupling means and in a second position to break contact therewith.

2. Filtering apparatus comprising in combination, a tank, a filter element adapted to be moved into and out of said tank, a stationary column spaced from said tank, a stationary coupling means mounted upon said column, a first conduit attached to one end of said coupling means, means for controlling flow through said first conduit, a second conduit attached at one end to the filter element, a framework mounted upon said column, an adjustable filter manipulating member mounted upon said framework for movement in a plane including said tank and said coupling means and comprising a support for said filter and said second conduit, and an abutment mounted upon the manipulatnig member having the second end of the second conduit attached to the abutment and adapted in one position to make fluid-tight contact with the coupling means and in a second position to break contact therewith.

3. Apparatus as recited in claim 2, wherein said means for controlling flow through said first conduit normally inhibits flow through said conduit.

4. Apparatus as recited in claim 2, wherein said means for controlling flow through said first conduit is opened by contact with the abutment mounted upon the manipulating member in order to permit flow through said conduit.

5. Filtering apparatus comprising in combination, a plurality of tanks, a filter element adapted to be moved into and out of any selected tank, a stationary column centrally disposed with respect to said tanks, a stationary plate mounted upon said column, a plurality of coupling means radially mounted upon said plate, a passage through each coupling means, a plurality of conduits of deformable, flexible material, each respectively connected to one end of said passages, a plurality of means controlling flow through said conduits by pinching the same and normally biased to pinch said conduits into closed position, a movable conduit attached at one end to said filter element, a rotatable framework mounted upon said column, an adjustable filter manipulating member mounted upon said framework for movement in a plane including a tank and a coupling means corresponding thereto and comprising a support for said filter and said movable conduit, and a movable abutment mounted upon the manipulating member having the second end of the movable conduit attached to the abutment and adapted in one position to make fluid-tight contact with a selected coupling element and in a second position to break contact therewith, said abutment including a portion serving to contact a flow controlling means corresponding to the selected coupling means for releasing the pinching action of the same and permitting flow through the respective conduit and the filter element when the abutment is in coupled engagement with such selected coupling means.

6. Apparatus as recited in claim 5, wherein said plate is provided with a plurality of slots corresponding to the plurality of coupling means and engagable by said abutment for guiding the abutment into coupling engagement with a selected coupling means.

7. Apparatus as recited in claim 5, wherein said plate is provided with a peripheral edge serving to prevent contact of said abutment and any flow controlling means when said abutment is displaced from a radial position corresponding to a radial position of a tank with respect to the stationary column.

8. Apparatus as recited in claim 5, wherein said filter manipulating member is pivotally mounted upon the framework adjacent the column for movement vertically with respect to the framework.

9. Apparatus as recited in claim 5, wherein the abutment and filter manipulating member provide a bell crank mechanism pivotally mounted upon the framework adjacent the column for movement vertically with respect to the framework.

10. Valve mechanism comprising a stationary column, a stationary supporting plate mounted upon said column, a conduit coupling means mounted upon said plate, a passage through said coupling means, a first conduit of deformable flexible material connected to one end of said passage, means controlling flow through said conduit by pinching the same and normally biased to pinch the conduit into closed position, a movable abutment mounted adjacent the coupling means for travel along a predetermined path into and out of substantially fluid-tight coupled engagement with the second end of the passage, a second conduit carried by the movable abutment and adapted for communication with the passage in said coupling means, said abutment including a portion serving to contact said biased means for releasing the pinching action of the same and permitting flow through the first conduit when said abutment is in coupled engagement with the coupling means.

11. Valve mechanism comprising a stationary column, a stationary supporting plate mounted upon said column, a conduit coupling means mounted upon said plate, a passage through said coupling means, a first conduit of deformable flexible material connected to one end of said passage, means controlling flow through said conduit by pinching the same and normally biased to pinch the conduit into closed position, a movable abutment mounted adjacent the coupling means for travel along a predetermined path into and out of substantially fluid-tight coupled engagement with the second end of the passage, a guide slot arranged in the periphery of said plate defining the predetermined path of movement of said abutment into coupled engagement with the coupling means, a second conduit carried by the movable abutment and adapted for communication with the passage in said coupling means, said abutment including a portion serving to contact said biased means for releasing the pinching action of the same and permitting flow through the first conduit when said abutment is in coupled engagement with the coupling means.

12. Valve mechanism comprising a stationary column, a stationary supporting plate mounted upon said column, a plurality of stationary conduit coupling means radially mounted upon said plate, a passage through each coupling means, a plurality of conduits of deformable, flexible material, each respectively connected to one end of said passages, a plurality of means controlling flow through said conduits by pinching the same and normally biased to pinch said conduits into closed position, a movable abutment mounted adjacent the stationary plate for travel along a predetermined path into and out of substantially fluid-tight coupled engagement with the second end of the passage in a selected coupling means, guide slots arranged in the periphery of said plate defining the predetermined paths of movement of said abutment into coupling engagement with the coupling means, a movable conduit carried by the movable abutment and adapted for communication with the passage in the selected coupling means, said abutment being rotatable about said column and including a portion serving to contact the flow controlling means corresponding to the selected coupling means for releasing the pinching action of the same and permitting flow through the respective conduit when said abutment is in coupled engagement with such selected coupling means.

13. Apparatus as recited in claim 12, wherein said plate is provided with a peripheral edge serving to prevent contact of said abutment and any flow controlling means when said abutment is disengaged from a slot in said plate.

References Cited in the file of this patent

UNITED STATES PATENTS

| | | |
|---|---|---|
| 324,031 | Lacey | Aug. 11, 1885 |
| 743,652 | Moore | Nov. 10, 1903 |
| 887,268 | Porter et al. | May 12, 1908 |
| 945,193 | Ridgeway | Jan. 4, 1910 |
| 1,051,620 | Neil | Jan. 28, 1913 |
| 1,172,989 | Harrison | Feb. 22, 1916 |
| 1,872,792 | Neorr | Aug. 23, 1932 |
| 1,876,928 | Lormor | Sept. 13, 1932 |
| 2,068,257 | Banks et al. | Jan. 19, 1937 |

FOREIGN PATENTS

| | | |
|---|---|---|
| 340,638 | Germany | Dec. 7, 1919 |